United States Patent
Thaw

(10) Patent No.: US 11,998,979 B2
(45) Date of Patent: Jun. 4, 2024

(54) METHODS OF ADDITIVE MANUFACTURING AND HYPERBARIC CHAMBERS MANUFACTURED BY ADDITIVE MANUFACTURING

(71) Applicant: RX AIR ENTERPRISES LLC, Houston, TX (US)

(72) Inventor: Stanley Thaw, Fort Lauderdale, FL (US)

(73) Assignee: RX AIR ENTERPRISES LLC, Houston, TX (US)

( * ) Notice: Subject to any disclaimer, the term of this patent is extended or adjusted under 35 U.S.C. 154(b) by 0 days.

(21) Appl. No.: 18/316,872

(22) Filed: May 12, 2023

(65) Prior Publication Data
US 2023/0364679 A1   Nov. 16, 2023

Related U.S. Application Data

(60) Provisional application No. 63/342,547, filed on May 16, 2022.

(51) Int. Cl.
*B22F 10/00* (2021.01)
*B22F 10/22* (2021.01)
*B33Y 10/00* (2015.01)
*B33Y 80/00* (2015.01)

(52) U.S. Cl.
CPC .............. *B22F 10/00* (2021.01); *B22F 10/22* (2021.01); *B33Y 10/00* (2014.12); *B33Y 80/00* (2014.12)

(58) Field of Classification Search
CPC .......... B22F 10/00; B22F 10/22; B33Y 10/00; B33Y 80/00
See application file for complete search history.

(56) References Cited

U.S. PATENT DOCUMENTS

| 4,546,530 A * | 10/1985 | Rizk | E04B 1/3483 |
| | | | 29/430 |
| 2017/0100294 A1* | 4/2017 | Acevedo | A61G 10/026 |

FOREIGN PATENT DOCUMENTS

| CN | 108748606 A | 11/2018 |
| CN | 113854763 A | 12/2021 |
| RU | 2583801 C1 * | 5/2016 |

OTHER PUBLICATIONS

SignaMP: Multiplace Hyperbaric System, [visited: May 12, 2023] Available from internet URL:https://perrybaromedical.com/wp-content/uploads/2015/07/SigmaMP.pdf.
Sechrist Industries, Inc.'s Post on Linkedin, [visited: May 12, 2023] Available from internet URL:https://www.linkedin.com/posts/sechrist-industries_shop-online-and-save-big-sechrist-mixers-activity-7052688538936504320-bs_-/?utm_source=share&utm_medium=member_ios.
Medical Device Depot, 21881 Low Profile Transport Stretcher, [visited: May 12, 2023] Available from internet URL: https://www.medicaldevicedepot.com/Low-Profile-Transport-Stretcher-p/21881.htm.

(Continued)

*Primary Examiner* — Monica A Huson
*Assistant Examiner* — Kelsey C Grace
(74) *Attorney, Agent, or Firm* — ArentFox Schiff LLP

(57) ABSTRACT

Aspects of the present disclosure include methods for providing a site for the hyperbaric chamber, installing a deposition system at the site, wherein the deposition system is configured to deposit building materials for constructing the hyperbaric chamber, loading a layout of the hyperbaric chamber into the deposition system, and depositing the building materials according to the layout onto the site.

17 Claims, 7 Drawing Sheets

(56) References Cited

OTHER PUBLICATIONS

Medical Device Depot, 20400 Low Flow Air Oxygen, [visited May 12, 2023] Available from internet URL:https://www.medicaldevicedepot.com/20400-Low-Flow-Air-Oxygen-p/20400.htm.

Hyperbaric Chamber Google Image Results, [visited: May 12, 2023] Available from internet URL:https://www.google.com/imgres?imgurl=https://hyperbaric-chamber.com/wp-content/uploads/multiplace-hyperbaric-chamber-model-7200-sl-interior-1024x768.jpg&tbnid=5w_5Agl-yLPVgM&vet=1&imgrefurl=https://hyperbaric-chamber.com/multiplace-hyperbaric-chamber/model-7200-sl-multiplace-hyperbaric-chamber/&docid=076kUZejPHLdPM&w=1024&h=768&hl=en-us&source=sh/x/im.

Hyperbanc Chamber royalty-free images on shutterstock [visited: May 12, 2023] Available from internet URL:https://www.shutterstock.com/search/hyperbaric-chamber?c3apidt=&ds_ag=FF=DSA+-+All+Pages_AU=Prospecting&ds_agid=s8700003$_5$04$_5$9$_2$9$_5$9&ds_cid=717000000$_2$73880$_2$0&ds_eid=7000000014003t0&gclid=EAlaIQobChMImYr7goW-_gIVqv3jBx3Q_Qw6EAAYASAAEgJta_D_BwE&gclsrc=aw.ds&kw=&utm_campaign=CO=US_LG=EN_BU=IMG_AD=DSA_TS=Iggeneric_RG=AMER_AB=ACQ CH=SEM_OG=CONV PB=Google&utm_medium=cpc&utm_source=GOOGLE.

"Inpatient vs. Outpatient: Comparing Two Types of Patient Care", St. George's University School of Medicine, [visited May 12, 2023] Available from internet URL:https://www.sgu.edu/blog/medical/inpatient-versus-outpatient/ (Year: 2021).

Iguchi, Kota, 3D OOH Nike Air Max Day 2022. Tokyo, Shinjuku, Behance, [visited May 12, 2023] Available from Internet URL:https://www.behance.net/gallery/144114301/AIRMAXDAY-2022-TOKYO (Year: 2022).

Samsung DooH Display Solutions, Discovering new opportunities for advertisement through state-of-the-art-technology, [visited May 12, 2023] Available from internet URL:https://displaysolutions.samsung.com/pdf/e-catalog/3703/2018_Samsung_DooH_Display_Solution_Catalog_190424_v1_2p.pdf (Year: 2018).

The Tallest 3D Printed Building in the World is Now in Saudi Arabia, COBOD, [visited May 12, 2023] Available from Internet URL:https://cobod.com/the-worlds-tallest-3d-printed-building-is-now-in-saudia-arabia/ (Year 2022).

The biggest 3D printed building, YouTube, [visited May 12, 2023] Available from internet URL:https://www.youtube.com/watch?v=69HrqNnrfh4 (Year: 2020).

CKD, Nitrogen gas extraction unit, Model No. NS NSU, [visited May 12, 2023] Available from internet URL:https://www.ckd.co.jp/kiki/en/product/detail/110/.

Aviv, Redefining Stroke Recovery, [visited May 12, 2023] Available from internet URL: https://aviv-clinics.com/?utm_campaign=Branded%20The%20Villages&gclid=EAlaIQobChMI0b2InKzw_gIVJ8jjBx0U5gQqEAAYASAAEgKKH_D_BWE.

* cited by examiner

METHODS OF ADDITIVE MANUFACTURING AND HYPERBARIC CHAMBERS MANUFACTURED BY ADDITIVE MANUFACTURING

CROSS-REFERENCE TO RELATED APPLICATION

This application claims priority to, and the benefit of, U.S. Patent Application No. 63/342,547 filed on May 16, 2022, the contents of which are hereby incorporated by reference in their entireties.

TECHNICAL FIELD

The present disclosure relates to additive manufacturing.

BACKGROUND

Hyperbaric chambers are used to treat patients with a variety of health issues, such as infections and embolism. A hyperbaric chamber provides an atmosphere where the air pressure is elevated to a level that is higher than the air pressure at ground level. When a patient is in a hyperbaric chamber, more oxygen is delivered to the patient. The extra oxygen may allow the patient to better fight infections, and/or may trigger the release of growth factors and/or stem cells. However, the constructions of hyperbaric chambers may be challenging. Traditional hyperbaric chambers are constructed in a single piece. Therefore, it may be difficult to construct and/or transport hyperbaric chambers into a health facility, and improvements are desirable.

SUMMARY

The following presents a summary of one or more aspects of the disclosure in order to provide a basic understanding of such aspects. This summary is not an extensive overview of all contemplated aspects, and is intended to neither identify key or critical elements of all aspects, nor delineate the scope of any or all aspects. Its sole purpose is to present some concepts of one or more aspects of the disclosure in a simplified form as a prelude to the more detailed description that is presented later.

Aspects of the present disclosure include methods for providing a site for the hyperbaric chamber, installing a deposition system at the site, wherein the deposition system is configured to deposit building materials for constructing the hyperbaric chamber, loading a layout of the hyperbaric chamber into the deposition system, and depositing the building materials according to the layout onto the site.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative implementations when read in conjunction with the accompanying drawings, wherein:

DETAILED DESCRIPTION

The present disclosure includes methods for constructing a hyperbaric chamber using additive manufacturing and hyperbaric chambers constructed using additive manufacturing. Aspects of the present disclosure include constructing a hyperbaric chamber at a site of a medical facility using additive manufacturing. In some aspects, a deposition system for additive manufacturing may be installed at the site of the medical facility. The deposition system may deposit building materials to construct the hyperbaric chamber on-site. They hyperbaric chamber may be configured to maintain a positive pressure. The hyperbaric chamber may be able to withstand an internal pressure between one atmosphere (atm) and six atm. Other pressure range may be possible according to aspects of the present disclosure. In one aspect of the present disclosure, the hyperbaric chamber may be constructed before construction of the medical facility. For example, after the construction of the hyperbaric chamber, the medical facility may be constructed around the hyperbaric chamber.

In some aspects, the hyperbaric chamber may be a multi-place hyperbaric chamber. The multi-place hyperbaric chamber may include multiple individual chambers and/or multiple floors.

In some aspects, the hyperbaric chamber may be constructed according to Joint Commission standards, Occupational Safety and Health Administration (OSHA) standards, and/or American with Disabilities Act (ADA) guidelines. The designs for the hyperbaric chamber may include one or more of the following features: functional, flexible and modular construction, cost effective and efficient design, fire retardant construction, earthquake-resistant construction, hurricane and tornado resistance, flood resistance, reusable energy enabled, a solid building envelop, recycled building materials, non-toxic materials, proper moisture levels, proper acoustic and sound construction, and/or easy cleaning structure.

Figure 1:
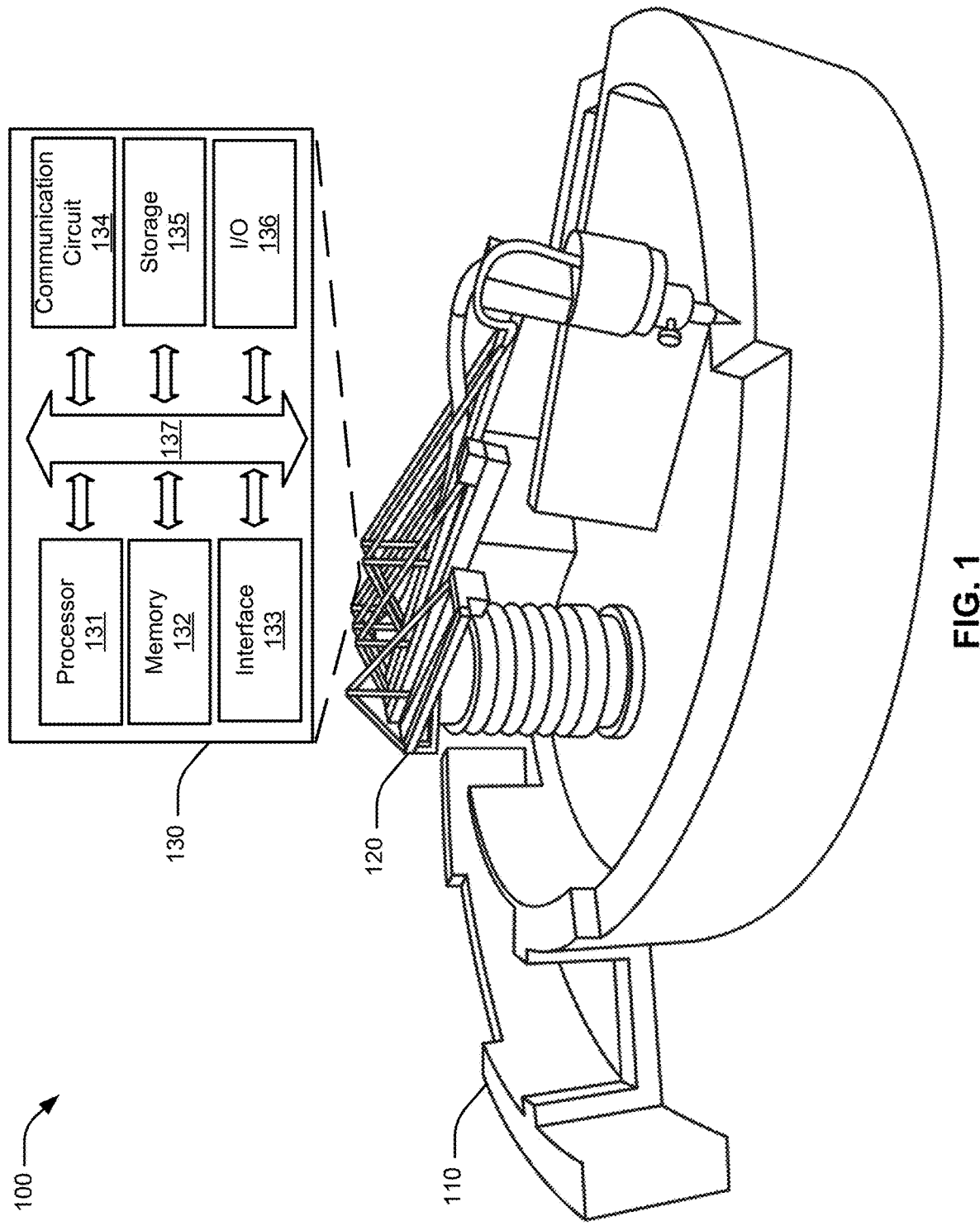
FIG. 1 illustrates an example of an environment for constructing a hyperbaric chamber using additive manufacturing according to aspects of the present disclosure.

FIG. 1 illustrates an example of an environment 100 for constructing a hyperbaric chamber 110. In some aspects, the environment 100 may include a deposition system 120 configured to deposit the hyperbaric chamber 110. The deposition system 120 may include a controller 130 configured to load a schematic of the hyperbaric chamber 110. The deposition system 120 may be configured to deposit the hyperbaric chamber 110 based on the schematic.

In some aspects, the deposition system 120 may be installed at a site of a medical facility (not shown). The deposition system 120 may be installed prior to the construction of the medical facility. In some aspects of the present disclosure, the foundation for the hyperbaric chamber 110 may be prepared prior to the construction of the hyperbaric chamber 110. For example, one or more trenches and/or holes may be dug underneath the hyperbaric chamber 110. The trenches and/or holes may be filled with sand, gravel, insulation, concrete, or other suitable materials.

In some aspects of the present disclosure, the deposition system 120 may be configured to load a schematic 200 (FIG. 2) of the hyperbaric chamber 110. The schematic 200 may be include a blueprint and/or layout of the hyperbaric chamber 110. For example, the schematic 200 may include a layout of the foundations, walls, floors, ceilings, and/or other infrastructures relating to the hyperbaric chamber 110.

In one aspect of the present disclosure, the deposition system 120 may include a controller 130. The controller 130 may be in a single package or as a chip set assembly with multiple components. The controller 130 may include a processor 131 configured to execute instructions stored in a memory 132. The memory 132 may include computer executable instructions. The controller 130 may include an interface circuit 133 configured to provide a hardware interface with external devices. The controller 130 may include a communication circuit 134 configured to communicate via wired or wireless communication channels. The controller 130 may include a storage 135 configured to store digital information. The controller 130 may include an input/output (I/O) interface device 136 configured to receive input signals and/or transmit output signals. The controller 130 may include a bus 137 configured to provide connections among the subcomponents of the controller 130.

During operation, in one aspect of the present disclosure, the controller 130 of the deposition system 120 may load the schematic 200 of the hyperbaric chamber 110 into the memory 132 and/or storage 135 of the controller 130. The deposition system 120 may be deposit the hyperbaric chamber 110 based on the schematic 200. The deposition system 120 may deposit the hyperbaric chamber 110 using one or more building materials. The building materials may be solid, liquid, or gas. Examples of building materials include carbon fiber, Kevlar, and/or stainless steel, among others. The deposition system 120 may deposit the hyperbaric chamber 110 layer by layer. The deposition system 120 may deposit one or more of the foundations, walls, floors, ceilings, and/or other infrastructures of the hyperbaric chamber 110.

In some aspects, the hyperbaric chamber 110 may include one or more floors/levels. The hyperbaric chamber 110 may include one or more chambers. In one example, a first level (i.e., ground level) of the hyperbaric chamber 110 may be configured to accommodate patients that are ambulatory, wheelchair bound, and/or on gurneys. A second level (i.e., not ground level) of the hyperbaric chamber 110 may be configured to accommodate patients that are not mobility restricted (patients that can walk and/or stand without assistance). Access to the second level may be via an exterior moving stairway and/or an exterior elevator. As such, during an emergency, staff members associated with the medical facility and/or hyperbaric chamber 110 may direct and/or assist patients to the moving stairway and/or the exterior elevator.

In certain aspects, the hyperbaric chamber 110 may include multiple chambers (or rooms). The multiple chambers of the hyperbaric chamber 110 may be configured to treat multiple patients concurrently. Patients may be placed in different chambers of the hyperbaric chamber 110 based on treatment durations, medical conditions, service levels, mobility, and/or other considerations. For example, the hyperbaric chamber 110 may include a room designed for gurneys and/or wheelchairs so that patients on the gurneys and/or in the wheelchairs may enter the hyperbaric chamber 110 for treatment.

In one aspect of the present disclosure, the hyperbaric chamber 110 may include an antechamber for the emergency deployment of any patient requiring urgent medical assistance during his/her treatment session. The antechamber may be configured to ensure that the treatments of patients are not interrupted if the antechamber needs to be utilized during a hyperbaric oxygen treatment session.

In some aspects, the entrances/exits of the hyperbaric chamber 110 may be sufficiently wide (e.g., more than 2.1 meters) to allow ease of access for patients, gurneys, wheelchairs, etc.

Figure 2:
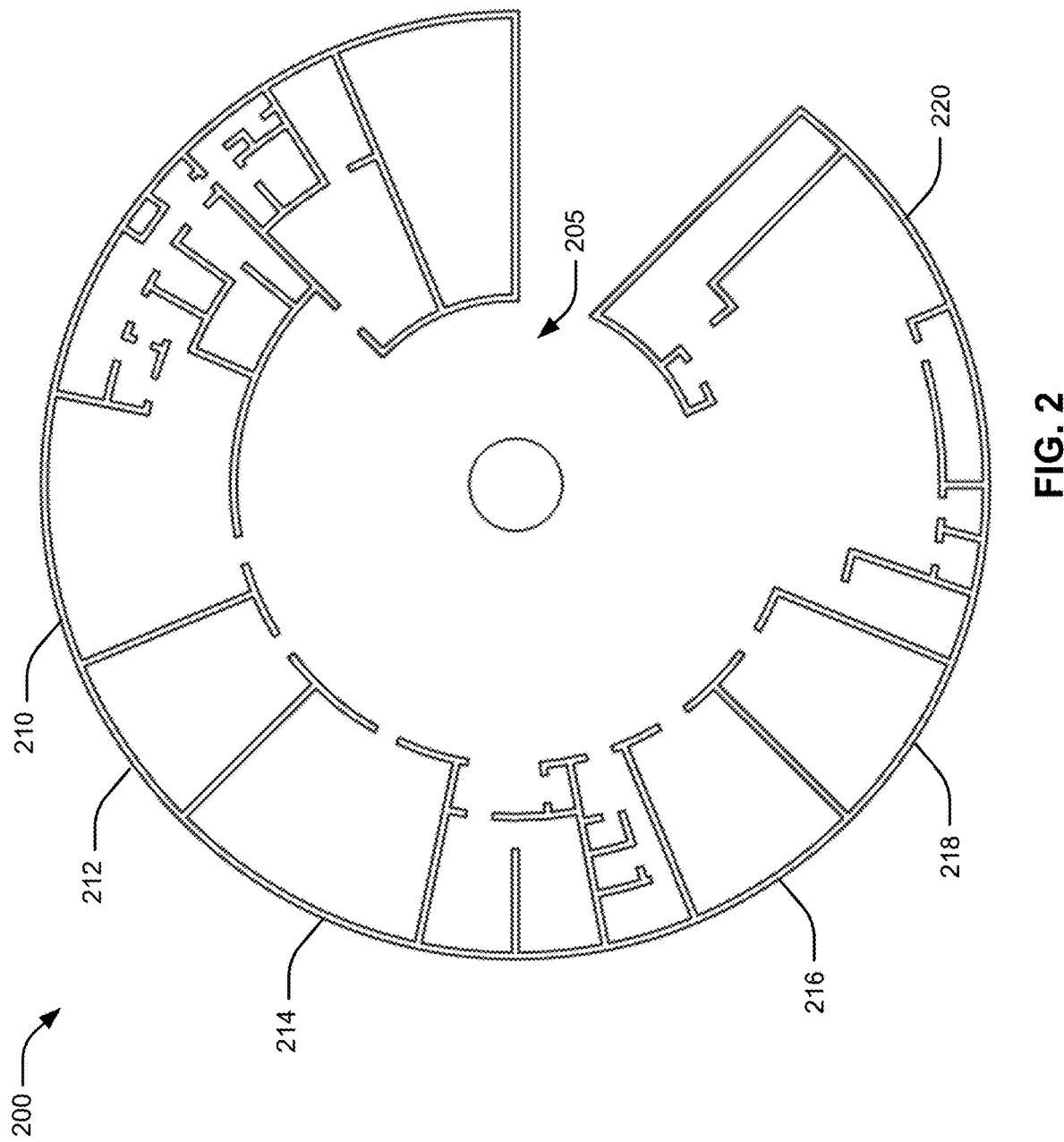
FIG. 2 illustrates an example of a schematic of the hyperbaric chamber according to aspects of the present disclosure.

FIG. 2 illustrates an example of the schematic 200 of the hyperbaric chamber 110 (FIG. 1) according to aspects of the present disclosure. In some aspects, the schematic 200 may illustrate a single floor of the hyperbaric chamber 110. The schematic 200 may illustrate the hyperbaric chamber 110 having a main chamber 205 and/or side chambers 210, 212, 214, 216, 218, 220. Each of the main chamber 205 and the side chambers 210, 212, 214, 216, 218, 220 may be designed for patients of different needs. For example, the main chamber 205 and the side chambers 210, 212, 214, 216, 220 may be designed based on the on treatment durations, medical conditions, service levels, mobility, and/or other considerations. In one instance, the main chamber 205 may be allocated for patients that require wheelchairs and/or gurneys. The side chamber 210 may be allocated for patients that require extended treatments in the hyperbaric chamber 110. The side chamber 212 may be designed to provide luxury accommodations for a select group of patients. The side chamber 214 may provide chairs for patients that are able to walk in unassisted. The side chambers 216, 218 may be a private chamber for providing an individual patient with privacy during the treatment process. Other numbers of chambers and/or purposes for the chambers may also be implemented according to aspects of the present disclosure.

Figure 3:
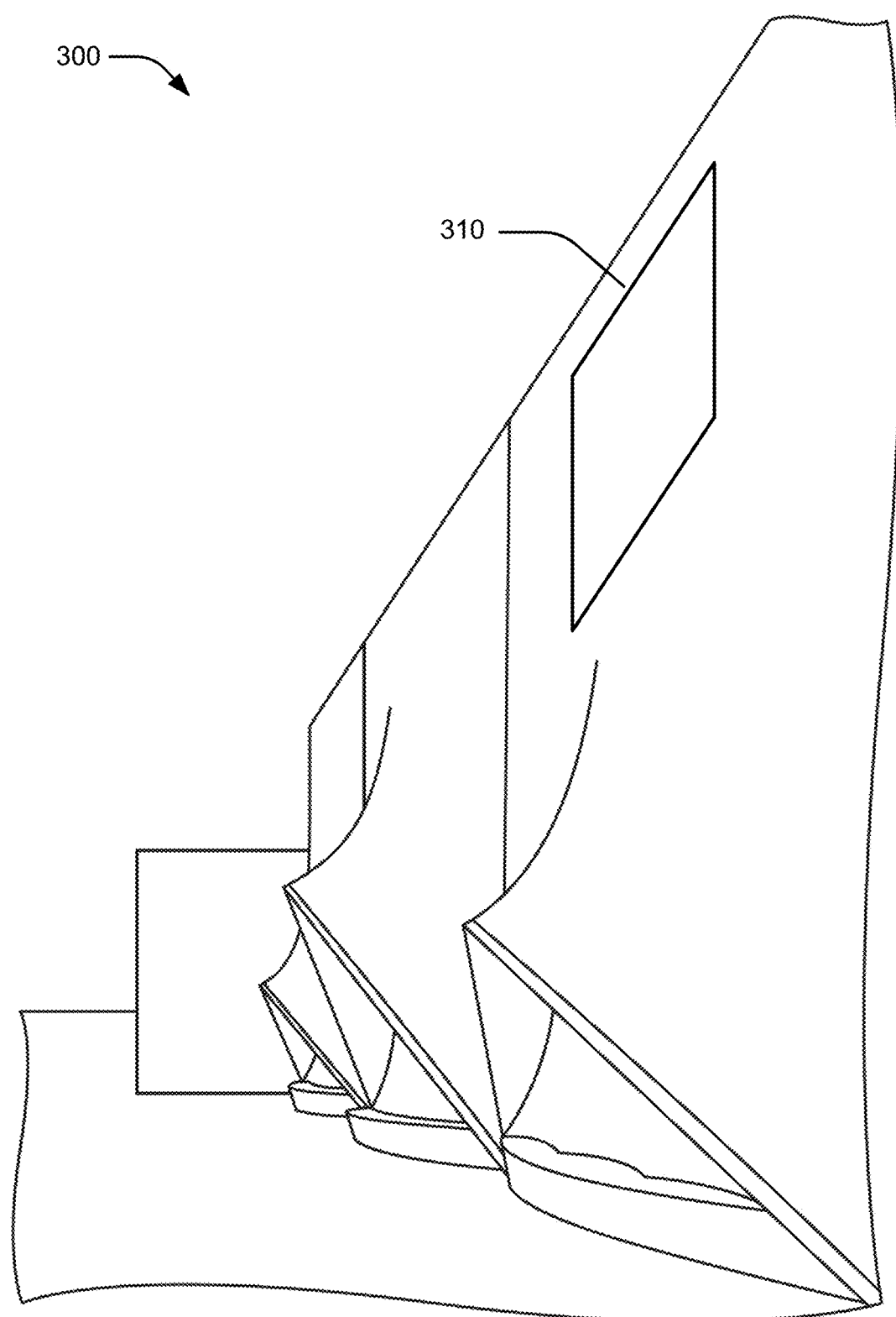
FIG. 3 illustrates an example of a medical facility built around the hyperbaric chamber according to aspects of the present disclosure.

FIG. 3 illustrates an example of a medical facility 300 built around the hyperbaric chamber 110 (FIG. 1). Aspects of the present disclosure includes building, after the deposition of the hyperbaric chamber 110 by the deposition system 120 (FIG. 1), the medical facility 300 around the hyperbaric chamber 110. The medical facility 300 may be constructed using the deposition system 120, traditional methods, and/or a combination thereof. The medical facility 300 may be an in-patient facility or an out-patient facility. The medical facility 300 may be a clinic, a surgical center, a hospital, a nursing home, a rehabilitation center, an urgent care, or other types of facilities. Other designs for the medical facility 300 may be implemented according to aspects of the present disclosure.

In some aspects, one or more anamorphic displays 310 may be installed on the sides of the medical facility 300. The one or more anamorphic displays 310 may create stereopsis effects to present three-dimensional (3D) contents. Examples of the one or more anamorphic displays 310 include 3D billboards. The one or more anamorphic displays 310 may display medical information, advertisements, administrative information, and/or other types of information. The one or more anamorphic displays 310 may be interactive interfaces.

Figure 4:
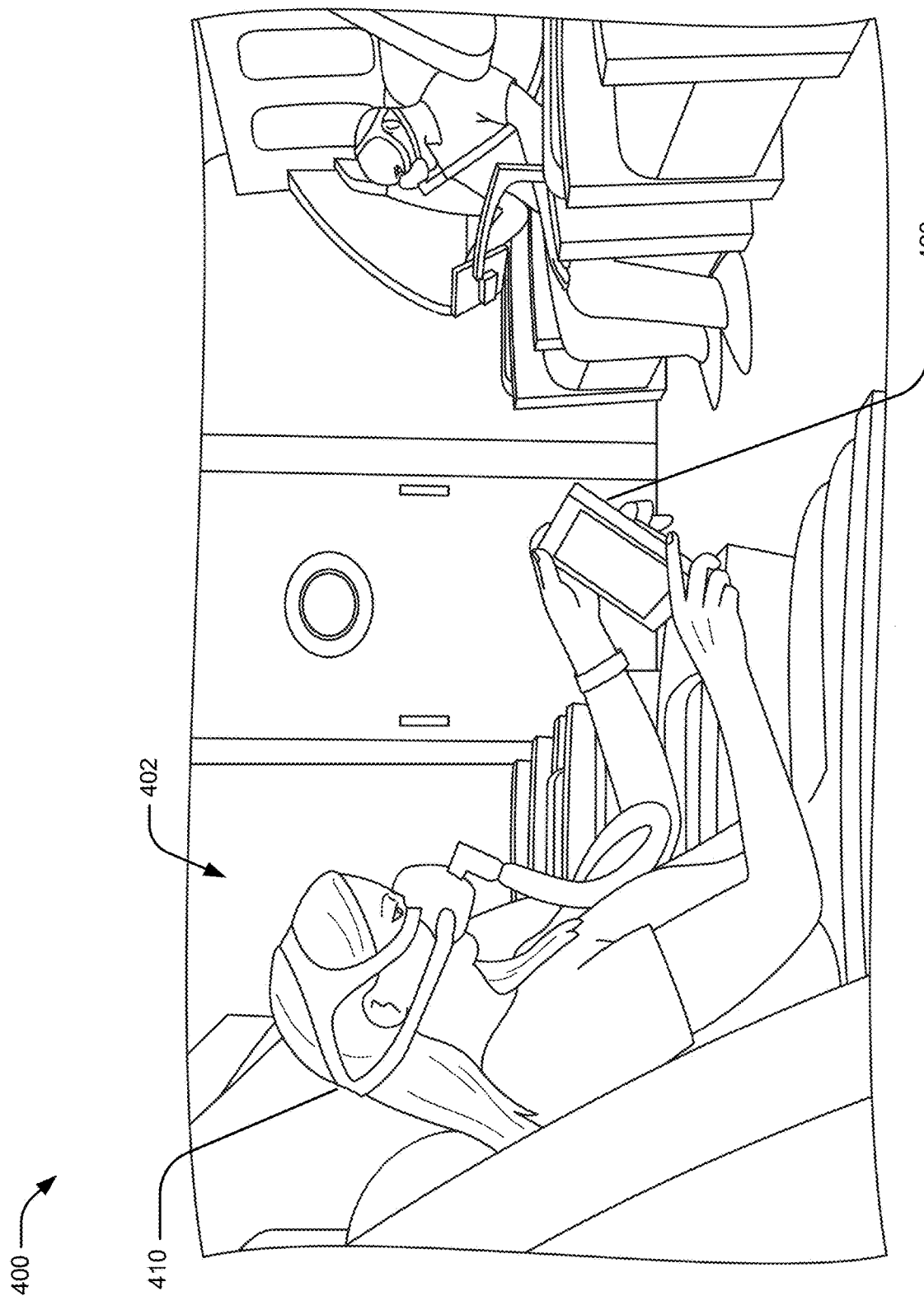
FIG. 4 illustrates an example of a chamber inside the hyperbaric chamber according to aspects of the present disclosure.

FIG. 4 illustrates an example of an interior view of a chamber 400 within the hyperbaric chamber 110 (FIG. 1). Inside the chamber 400, a patient 402 may be undergoing treatment. The patient 402 may be wearing a mask 410 for the oxygen treatment. In alternative implementations, the patient 402 may receive oxygen treatment under a hood (not shown). The purity of the oxygen provided to the patient 402 may range from 20% to 100%.

In some aspects, the interior of the chamber 400 may be illuminated using internal or external lamps, such as light emitting diode (LED) lighting fixtures. The patient 402 may use an entertainment device 420 during the treatment process. Examples of the entertainment device 420 may include tablet computers, laptops, game consoles, digital audio media systems, or other devices. In some aspects of the present disclosure, a projector (not shown) may project an image and/or a video onto a screen inside the chamber 400. The chamber 400 may include speakers for providing audio output (e.g., music, sounds for movies, instructions from staff members).

In some aspects of the present disclosure, the chamber 400 may include one or more sensors for monitoring the patient 402 and/or the environment in the chamber 400. Examples of the one or more sensors include pressure sensors, oxygen sensors for the chamber 400, oxygen sensors for the mask 410, smoke detectors, carbon monoxide detectors, temperature sensors, humidity sensors, or other types of sensors.

In one aspect of the present disclosure, the chamber 400 include cameras configured to monitor the patient 402.

In some aspects, the chamber 400 may include fire suppression tools such as water sprinklers, manual fire extinguishers (e.g., potassium bicarbonate), and/or automatic fire extinguishing systems.

Figure 5:
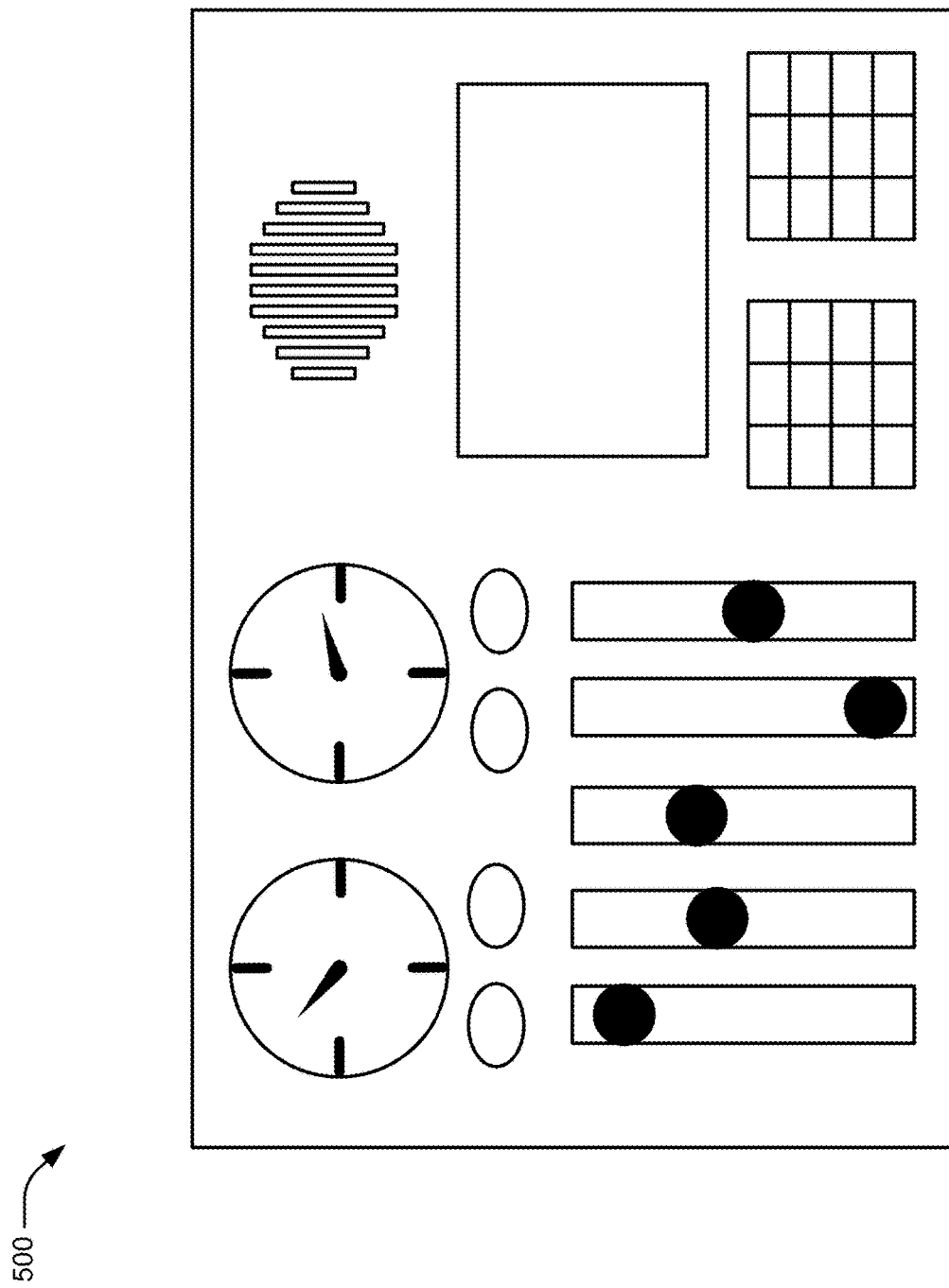
FIG. 5 illustrates an example of a control panel for monitoring the hyperbaric chamber according to aspects of the present disclosure.

FIG. 5 illustrates an example of a control panel 500 for controlling the hyperbaric chamber 110 (FIG. 1). The control panel 500 may be disposed outside the hyperbaric chamber 110. The control panel 500 may be configured to manage the medical and/or safety requirements of the hyperbaric chamber 110 and/or the patients within the hyperbaric chamber 110. In one aspect, the control panel 500 may include an auxiliary control panel (not shown) inside the hyperbaric chamber 110.

In some aspects of the present disclosure, the control panel 500 may be configured to monitor the patients in the hyperbaric chamber 110 via one or more cameras. For example, the control panel 500 may include an interface (e.g., display) for monitoring the hyperbaric chamber 110. The interface may be configured to display images from multiple cameras (e.g., four or more cameras displayed on the display). The control panel 500 may be configured to provide an audio communication interface (e.g., microphones and speakers on the control panel 500 and inside the hyperbaric chamber 110) to allow technicians to communicate with the patients. The control panel 500 may be powered by primary electrical power associated with the hyperbaric chamber 110, and may optionally include auxiliary electrical power from generators and/or batteries.

In some aspects, the control panel 500 may be configured to monitor and/or control one or more of the internal pressure (compression) of the hyperbaric chamber 110, the oxygen concentration to the hyperbaric chamber 110, the oxygen concentration and/or flow rates associated with the masks and/or hoods, water sprinkler system in the hyperbaric chamber 110, automatic and manual fire extinguishing systems, medical equipment used by the patients (e.g., pulse oximeters), temperatures, humidity, and/or other metrics/systems in the hyperbaric chamber 110.

Figure 6:
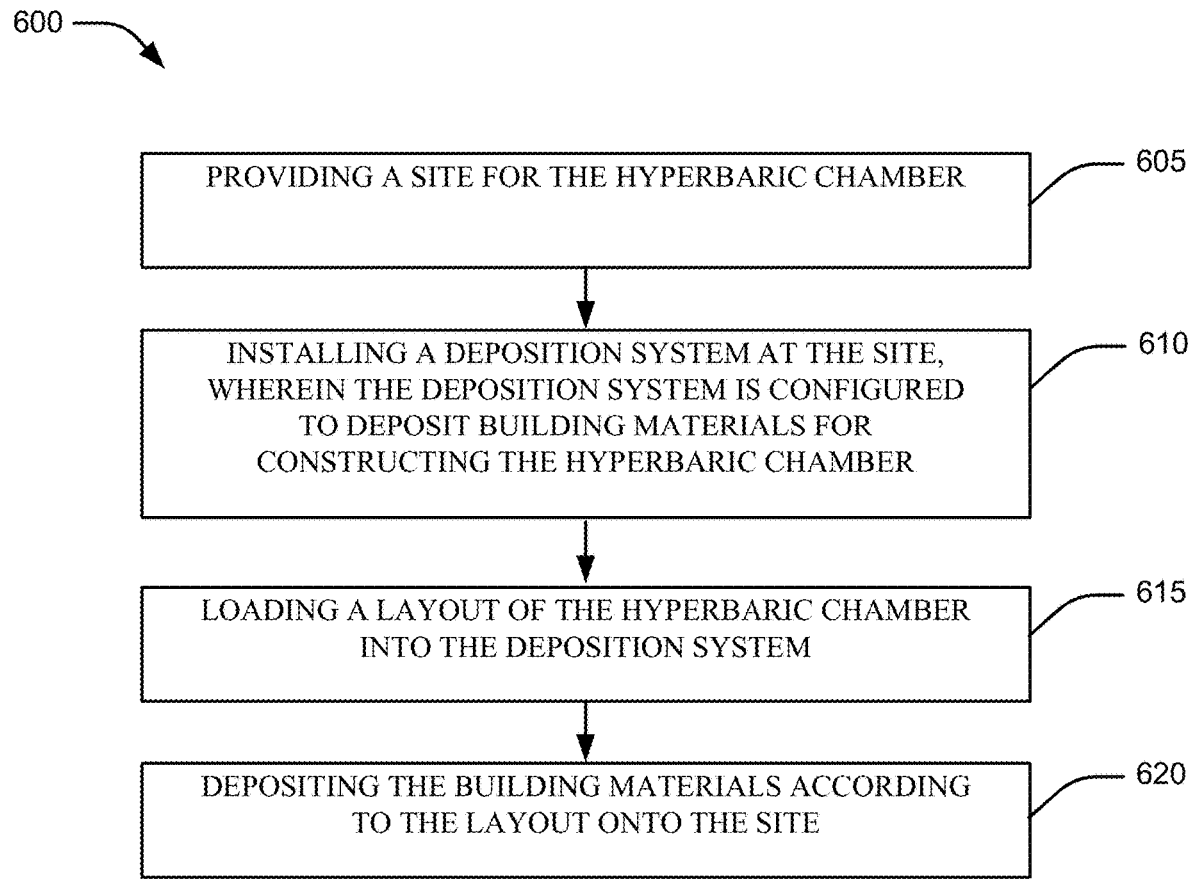
FIG. 6 illustrates an example of a flowchart for constructing a hyperbaric chamber according to aspects of the present disclosure.

Referring to FIG. 6, a method 600 for manufacturing a hyperbaric chamber is illustrated according to aspects of the present disclosure. In an example, the method 600 may be performed by one or more of the deposition system 120, the controller 130, and/or one or more subcomponents of the deposition system 120 or the controller 130.

In FIG. 6, block 605, the method 600 may optionally provide a site for the hyperbaric chamber.

At block 610, the method 600 may install a deposition system at the site, wherein the deposition system is configured to deposit building materials for constructing the hyperbaric chamber.

At block 615, the method 600 may load a layout of the hyperbaric chamber into the deposition system.

At block 620, the method 600 may deposit the building materials according to the layout onto the site.

Aspects of the present disclosure include the method above, further comprising building a medical facility around the hyperbaric chamber using additive manufacturing.

Aspects of the present disclosure include any of the methods above, wherein the building materials include one or more of a solid, a liquid, or a gas.

Aspects of the present disclosure include any of the methods above, wherein the building materials includes one or more of carbon fiber, Kevlar, or stainless steel.

Aspects of the present disclosure include any of the methods above, wherein the hyperbaric chamber is configured to operate between an internal pressure of 1 atmosphere and 6 atmosphere.

Aspects of the present disclosure include any of the methods above, wherein the hyperbaric chamber includes one or more floors.

Aspects of the present disclosure include any of the methods above, wherein the one or more floors includes a first floor for one or more gurneys or one or more wheelchairs and a second floor including seats for patients.

Aspects of the present disclosure include any of the methods above, wherein the hyperbaric chamber includes one or more chambers.

Figure 7:
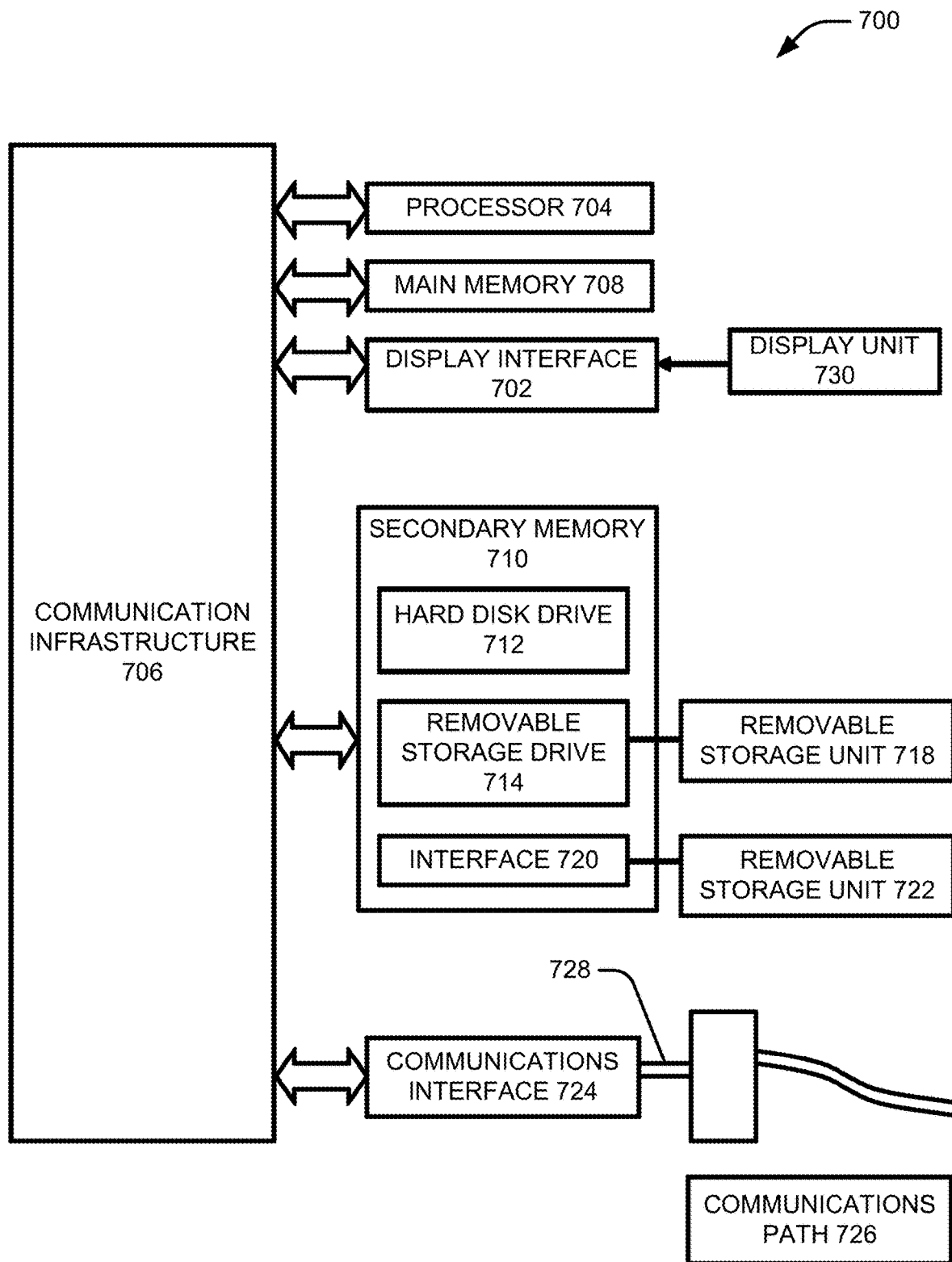
FIG. 7 illustrates a system diagram of an example of various hardware components and other features for controlling a deposition system, according to aspects of the disclosure.

Referring to FIG. 7, an example system for controlling the deposition system 120 (FIG. 1) is depicted with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 700 is shown in FIG. 7.

The computer system 700 may include one or more processors, such as processor 704. The processor 704 is connected to a communication infrastructure 706 (e.g., a communications bus, cross-over bar, or network). Various software aspects are described in terms of this example computer system 700. After reading this description, it will become apparent to a person skilled in the relevant art(s) how to implement aspects described herein using other computer systems and/or architectures.

The computer system 700 may include a display interface 702 that forwards graphics, text, and other data from the communication infrastructure 706 (or from a frame buffer not shown) for display on a display unit 730. The display unit 730 may be an example of a display for the entertainment device 420 and/or the control panel 500 (FIG. 5). The computer system 700 may also include a main memory 708, e.g., random access memory (RAM), and may also include a secondary memory 710. The secondary memory 710 may include, e.g., a hard disk drive 712 and/or a removable storage drive 714, representing a floppy disk drive, a magnetic tape drive, an optical disk drive, etc. The removable storage drive 714 may read from and/or write to a removable storage unit 718 in a well-known manner. The removable storage unit 718, represents a floppy disk, magnetic tape, optical disk, etc., which is read by and written to the removable storage drive 714. As will be appreciated, the removable storage unit 718 may include a computer usable storage medium having stored therein computer software and/or data.

In alternative aspects, the secondary memory 710 may include other similar devices for allowing computer programs or other instructions to be loaded into the computer system 700. Such devices may include, e.g., a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to the computer system 700.

The computer system 700 may also include a communications interface 724. The communications interface 724 may allow software and data to be transferred between the computer system 700 and external devices. Examples of the communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by the communications interface 724. These signals 728 are provided to the communications interface 724 via a communications path (e.g., channel) 726. This path 726 carries signals 728 and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals 728. These computer program products provide software to the computer system 700. Aspects described herein may be directed to such computer program products.

Computer programs (also referred to as computer control logic) may be stored in the main memory 708 and/or the secondary memory 710. The computer programs may also be received via the communications interface 724. Such computer programs, when executed, enable the computer system 700 to perform various features in accordance with aspects described herein. In particular, the computer programs, when executed, enable the processor 704 to perform such features. Accordingly, such computer programs represent controllers of the computer system 700. The computer programs may include instructions or code for executing methods for managing live event markets, as described herein.

In variations where aspects described herein are implemented using software, the software may be stored in a computer program product and loaded into the computer system 700 using the removable storage drive 714, the hard disk drive 712, or the communications interface 720. The control logic (software), when executed by the processor 704, causes the processor 704 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the aspects disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, including non-transitory computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of manufacturing a hyperbaric chamber, comprising:
    providing a site for the hyperbaric chamber;
    installing a deposition system for additive manufacturing at the site, wherein the deposition system is configured to deposit building materials for constructing the hyperbaric chamber using additive manufacturing;
    loading a layout of the hyperbaric chamber into the deposition system; and
    depositing the building materials according to the layout onto the site.

2. The method of claim 1, further comprising building a medical facility around the hyperbaric chamber using additive manufacturing.

3. The method of claim 2, wherein the building materials include one or more of a solid, a liquid, or a gas.

4. The method of claim 2, wherein the building materials include one or more of carbon fiber, Kevlar and stainless steel.

5. The method of claim 1, wherein the hyperbaric chamber is configured to operate between an internal pressure of 1 atmosphere and 6 atmospheres.

6. The method of claim 1, wherein the hyperbaric chamber includes one or more floors.

7. The method of claim 6, wherein the one or more floors include:
    a first floor for one or more gurneys or one or more wheelchairs; and
    a second floor including seats for patients.

8. The method of claim 1, wherein the hyperbaric chamber includes one or more chambers.

9. The method of claim 2, further comprising installing one or more anamorphic displays to one or more sides of the medical facility.

10. The method of claim 9, wherein the one or more anamorphic displays include a three-dimensional billboard.

11. The method of claim 9, further comprising:
    displaying medical information, advertisements, or administrative information Via the one or more anamorphic displays.

12. The method of claim 2, wherein the hyperbaric chamber includes at least one antechamber.

13. The method of claim 1, wherein the hyperbaric chamber includes one or more of internal or external lamps, an entertainment device, a speaker, or a display.

14. The method of claim 1, wherein the hyperbaric chamber includes one or more of a pressure sensor, an oxygen sensor, a smoke detector, a carbon monoxide detector, a temperature sensor, or a humidity sensor.

15. The method of claim 1, wherein the hyperbaric chamber includes one or more cameras.

16. The method of claim 15, further comprising monitoring one or more patients inside the hyperbaric chamber via the one or more cameras.

17. The method of claim 1, further comprising:
    controlling or monitoring, via a control panel, one or more of:

an internal pressure of the hyperbaric chamber;
an oxygen concentration of the hyperbaric chamber;
a temperature of the hyperbaric chamber; or
a humidity of the hyperbaric chamber.

\* \* \* \* \*